(12) United States Patent
Fang

(10) Patent No.: US 10,663,808 B2
(45) Date of Patent: May 26, 2020

(54) CURVED DISPLAY PANEL AND CURVED DISPLAY

(71) Applicant: BOE TECHNOLOGY GROUP CO., LTD., Beijing (CN)

(72) Inventor: Zheng Fang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 59 days.

(21) Appl. No.: 15/504,627

(22) PCT Filed: May 6, 2016

(86) PCT No.: PCT/CN2016/081226
§ 371 (c)(1),
(2) Date: Feb. 16, 2017

(87) PCT Pub. No.: WO2017/140039
PCT Pub. Date: Aug. 24, 2017

(65) Prior Publication Data
US 2018/0107044 A1    Apr. 19, 2018

(30) Foreign Application Priority Data

Feb. 19, 2016    (CN) .................. 2016 1 0094696

(51) Int. Cl.
*G02F 1/1339*    (2006.01)
*G02F 1/1333*    (2006.01)

(52) U.S. Cl.
CPC .... *G02F 1/13394* (2013.01); *G02F 1/133371* (2013.01); *G02F 2001/13396* (2013.01)

(58) Field of Classification Search
CPC ........... G02F 1/13394; G02F 1/133371; G02F 1/133611; G02F 2001/133388
See application file for complete search history.

(56) References Cited

U.S. PATENT DOCUMENTS

2004/0189914 A1    9/2004    Matsuyama
2009/0322668 A1*   12/2009   Sugiyama ............. G02F 1/1396
                                                        345/101
(Continued)

FOREIGN PATENT DOCUMENTS

CN    103955096 A    7/2014
CN    104111567 A    10/2014
(Continued)

OTHER PUBLICATIONS

International Search Report and Written Opinion in PCT/CN2016/081226 dated Oct. 25, 2016, with English translation. 14 pages.
(Continued)

*Primary Examiner* — Michael H Caley
*Assistant Examiner* — Mariam Qureshi
(74) *Attorney, Agent, or Firm* — Womble Bond Dickinson (US) LLP

(57) ABSTRACT

The embodiments of the present invention provide a curved display panel and a curved display. The curved display panel comprises an array substrate and a color film substrate arranged oppositely, a plurality of spacers arranged between the array substrate and the color film substrate, a first curved side edge and a second curved side edge opposite to the first curved side edge. A cell thickness of a central region is different with a cell thickness of a peripheral region closed to the first curved side edge or the second curved side edge, such that a light leakage amount of the peripheral region is smaller than a first preset value. The curved display comprises the curved display panel provided by the embodiment of the invention.

18 Claims, 3 Drawing Sheets

(56) References Cited

U.S. PATENT DOCUMENTS

| | | | |
|---|---|---|---|
| 2014/0092350 A1* | 4/2014 | Byeon | G02F 1/1339 349/106 |
| 2015/0286099 A1* | 10/2015 | Kang | G02F 1/133634 349/61 |
| 2016/0041443 A1 | 2/2016 | Wu | |
| 2016/0231607 A1 | 8/2016 | Wu et al. | |
| 2016/0295715 A1* | 10/2016 | Cho | B32B 7/12 |
| 2016/0349561 A1* | 12/2016 | Shiina | G02F 1/13394 |
| 2016/0370654 A1 | 12/2016 | You et al. | |
| 2017/0153671 A1* | 6/2017 | Yamazaki | G09G 3/32 |
| 2017/0171998 A1* | 6/2017 | Huang | H05K 5/0017 |
| 2017/0269386 A1 | 9/2017 | Xiang et al. | |

FOREIGN PATENT DOCUMENTS

| | | |
|---|---|---|
| CN | 104570448 A | 4/2015 |
| CN | 105182586 A | 12/2015 |
| CN | 105278175 A | 1/2016 |
| CN | 105467692 A | 4/2016 |

OTHER PUBLICATIONS

Office Action received for Chinese Patent Application No. 201610094696.8, dated Jan. 29, 2018, 10 pages (5 pages of English Translation and 5 pages of Office Action).

* cited by examiner

CURVED DISPLAY PANEL AND CURVED DISPLAY

RELATED APPLICATIONS

The present application is the U.S. national phase entry of the international application PCT/CN2016/081226, with an international filing date of May 6, 2016, which claims the benefit of Chinese Patent Application No. 201610094696.8, filed on Feb. 19, 2016, the entire disclosures of which are incorporated herein by reference.

TECHNICAL FIELD

The present invention relates to the field of liquid crystal display technology, in particular to a curved display panel and a curved display.

BACKGROUND

A curved display is an arc-shaped design with an entire screen facing and surrounding the viewer, which can provide a wider viewing angle and wide panoramic image effect, and the off-axis viewing distortion is reduced when viewed at close range. However, an uneven brightness phenomenon exists under an L0 state (i.e., a full black state of the screen) of the existing curved display due to bending, which is known as Curved L0 Mura.

SUMMARY

To this end, an embodiment of the present invention provides a curved display panel and a curved display. The uneven brightness phenomenon under the full black state of the screen caused by bending of the curved display panel is avoided.

An embodiment of the invention provides a curved display panel. The curved display panel includes an array substrate and a color film substrate arranged oppositely, a plurality of spacers arranged between the array substrate and the color film substrate, a first curved side edge and a second curved side edge opposite to the first curved side edge. A cell thickness of a central region is different with a cell thickness of a peripheral region closed to the first curved side edge or the second curved side edge, such that a light leakage amount of the peripheral region is smaller than a first preset value.

Optionally, the curved display panel further includes a third side edge and a fourth side edge opposite to the third side edge. The third side edge and the fourth side edge are curved. The cell thickness of the central region is different with a cell thickness of a peripheral region closed to the third side edge or the fourth side edge.

Optionally, the cell thickness of the peripheral region is smaller than the cell thickness of the central region if a light leakage index is smaller than a second preset value, the cell thickness of the peripheral region is greater than the cell thickness of the central region if the light leakage index is greater than the second preset value. The light leakage index is a product of a designed cell thickness of the curved display panel and a refractivity difference of liquid crystal birefringence. The second preset value is a maximum light leakage index of a maximum light leakage amount for the curved display panel.

Optionally, distribution densities of the spacers in every region of the curved display panel are the same. A height of the spacers in the peripheral region is smaller than a height of the spacers in the central region if the light leakage index is smaller than the second preset value, the height of the spacers in the peripheral region is greater than the height of the spacers in the central region if the light leakage index is greater than the second preset value.

Optionally, the original heights of the spacers in every region of the curved display panel are the same. A distribution density of the spacers in the peripheral region is smaller than a distribution density of the spacers in the central region if the light leakage index is smaller than the second preset value, the distribution density of the spacers in the peripheral region is greater than the distribution density of the spacers in the central region if the light leakage index is greater than the second preset value.

Optionally, the distribution density of the spacers in the peripheral region differs by at least three times from the distribution density of the spacers in the central region.

Optionally, the plurality of spacers are arranged on a side of the color film substrate close to a liquid crystal layer.

Optionally, the plurality of spacers are arranged on a side of the array substrate close to a liquid crystal layer.

Optionally, the height of the spacer is in a range of 0.1 μm-10 μm.

Optionally, the peripheral region occupies 10%-30% of a display region of the curved display panel.

Optionally, the peripheral region is a left peripheral region and/or a right peripheral region on the viewing side of the curved display panel.

Optionally, the cell thickness of the curved display panel gradually changes from the central region to the peripheral region.

An embodiment of the present invention also provides a curved display. The curved display includes the curved display panel according to any one of the abovementioned embodiments.

In the curved display panel and curved display provided by the embodiments of the invention, based on the parameter of liquid crystal refractive index and cell thickness of the curved display panel, spacers with different heights or distribution densities are arranged between the array substrate and color film substrate. In this way, the cell thickness for different region of the curved display panel is different, the uneven brightness phenomenon caused by the light leakage on the peripheral region can be avoided, reducing light leakage. The display effect of the curved display panel is then improved.

DETAILED DESCRIPTION OF THE INVENTION

In order to more clearly illustrate the technical solutions and advantages of the embodiments, the detailed description will be introduced in connection with the drawings and the specific embodiments.

Figure 1:
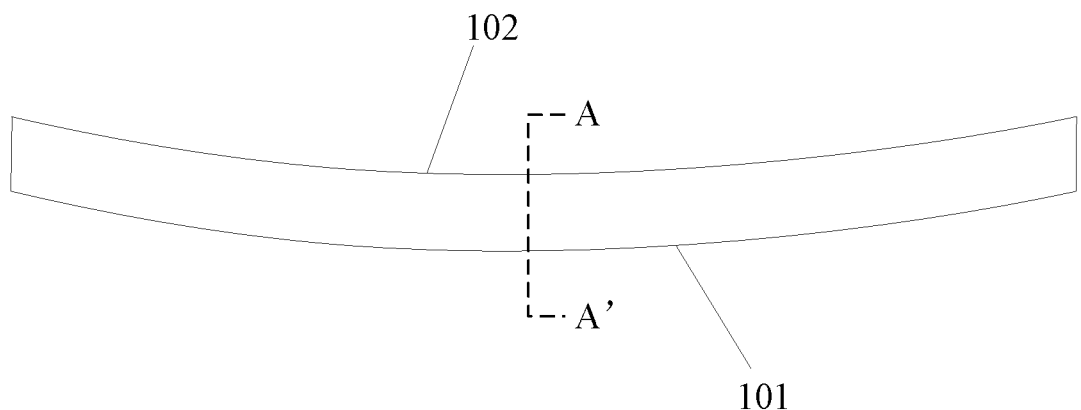
FIG. 1 is a side view of a curved display panel according to an embodiment of the invention.

An embodiment of the invention provides a curved display panel. FIG. 1 is a side view of a curved display panel showing a curved side edge. The curved display panel includes an array substrate 101 and a color film substrate 102 arranged oppositely.

In a curved display panel, a serious light leakage may occur on the peripheral region close to the curved side edge. This is due to the stress within the glass in a bending state, resulting in optical retardation with different values and directions in different regions of the curved display panel. Light leakage occurs in different regions due to the variation of the optical retardation caused by bending. When the cell thickness is small enough or large enough, the light leakage in the curved display panel can be reduced. In the curved display panel provided by the embodiment of the invention, a plurality of spacers are arranged between a array substrate and a color film substrate, the array substrate and the color film substrate are arranged oppositely. In the curved display panel, the cell thickness of the central region and the cell thickness of the periphery region are different due to the spacers, therefore, the inconsistency of the optical retardation with different values and directions in different regions of the curved display panel caused by the stress within the glass can be offset. By adjusting the cell thickness of different regions in the panel, the variation of the optical retardation in different regions can be offset. The uneven brightness phenomenon on the periphery region and the central region can thus be alleviated or eliminated, improving the display effect of the curved display panel.

If the cell thickness is small enough or large enough, the light leakage in the curved display panel can be reduced. For the curved display panel, the problem of uneven brightness in different regions caused by the light leakage of the periphery region can be solved. Therefore, in some embodiments of the invention, the cell thickness of the periphery region of the curved display panel is relatively large, the cell thickness of the central region is smaller than that of the periphery region. In some embodiments of the invention, the cell thickness of the periphery region of the curved display panel is relatively small, the cell thickness of the central region is greater than that of the periphery region. In an optional embodiment of the invention, in the curved display panel, the cell thickness of the periphery region is greater than the cell thickness of the central region.

Figure 6:
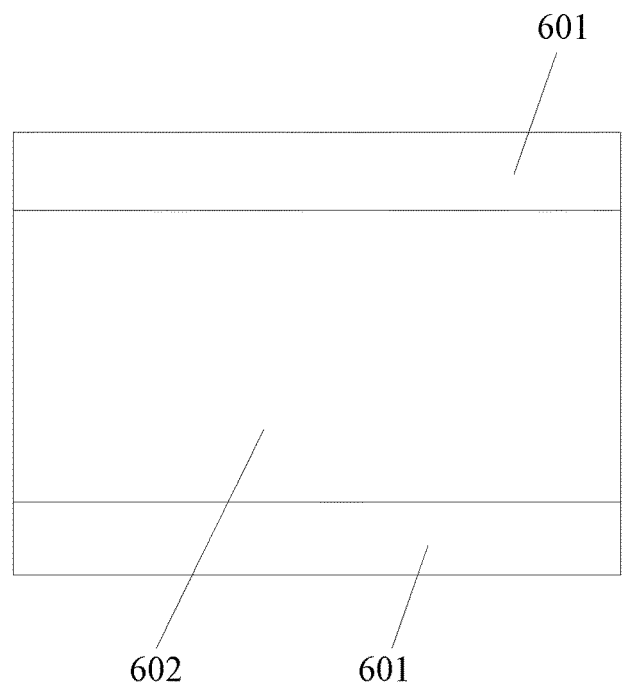
FIG. 6 is a schematic diagram for partitioning a curved display panel according to an embodiment of the invention.

In an embodiment of the invention, the spacing between the spacers can be equal or unequal, so that the distribution density of the spacer in different regions of the curved display panel may be the same or different. Through an experimental detection for light leakage, light leakage mainly occurs on the periphery region close to the curved side edge. Therefore, as shown in FIG. 6, in an embodiment of the invention, the top side edge and the bottom side edge of the curved display panel are curved. The periphery regions 601 include the regions respectively close to the top side edge and the bottom side edge. The central region 602 is the region between the periphery regions 601.

In some embodiments, the curved display panel further includes a third side edge and a fourth side edge opposite to the third side edge. The third side edge and the fourth side edge are curved. The cell thickness of the central region is different with a cell thickness of a peripheral region closed to the third side edge or the fourth side edge.

In an embodiment of the invention, a preset value can be an arbitrary brightness value which can improve the brightness uniformity of the central region and the peripheral region.

In some embodiments of the invention, the heights or the distribution densities of the spacers in different regions of the curved display panel are different. The cell thickness of the peripheral region is smaller than the cell thickness of the central region if a light leakage index is smaller than a second preset value. The cell thickness of the peripheral region is greater than the cell thickness of the central region if the light leakage index is greater than the second preset value.

The light leakage index is a product ($\Delta nd$) of a designed cell thickness of the curved display panel and a refractivity difference of liquid crystal birefringence, which can be measured by an experiment. The second preset value is a maximum light leakage index when the light leakage amount of the curved display panel is maximum. For liquid crystal of a given type, the refractivity difference of liquid crystal birefringence is constant. The light leakage index increases with the increase of the cell thickness, a curve of light leakage amount can thus be obtained by measurement. When the cell thickness is equal to a certain value which can be measured by experiment, a maximum light leakage amount can be achieved. The second preset value is a maximum light leakage index of a maximum light leakage amount for the curved display panel with liquid crystal of a given type.

In the prior art, the cell thickness is the same in every region of the curved display panel. The designed cell thickness of the curved display panel refers to a cell thickness of the curved display panel designed in advance, without considering the difference of the light leakage amounts in the peripheral region and the central region.

Figure 4:
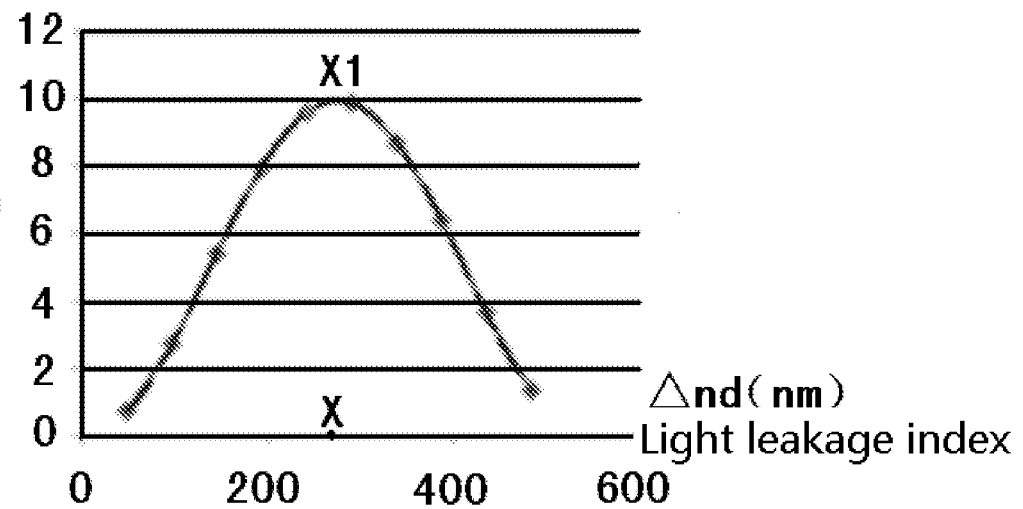
FIG. 4 is a schematic diagram of the relationship between the light leakage state and the light leakage index.

FIG. 4 shows a simulated relationship between $\Delta nd$ and the light leakage amount when the curved display panel is in a bending state. $\Delta n$ is the refractivity difference of liquid crystal birefringence, i.e. the difference between the refractive index of extraordinary light and the refractive index of ordinary light, d is the cell thickness. At the point X1 with a maximum light leakage amount, the corresponding $\Delta nd$ value is X (i.e., the second preset value). If $\Delta nd$ is smaller than X, the light leakage amount increases with the increase of the cell thickness. If $\Delta nd$ is greater than X, the light leakage amount decreases with the increase of the cell thickness. According to an actual measurement, X is approximately 273 nm.

In the embodiments of the invention, considering the possibility of error, there may be a deviation between the specific value of X and the value provided by the above embodiment.

In some embodiments of the invention, the original heights of the spacers in every region of the curved display panel are the same. The distribution density of the spacers in the peripheral region is smaller than the distribution density of the spacers in the central region if the light leakage index is smaller than the second preset value. The distribution density of the spacers in the peripheral region is greater than the distribution density of the spacers in the central region if the light leakage index is greater than the second preset value.

Figure 2:
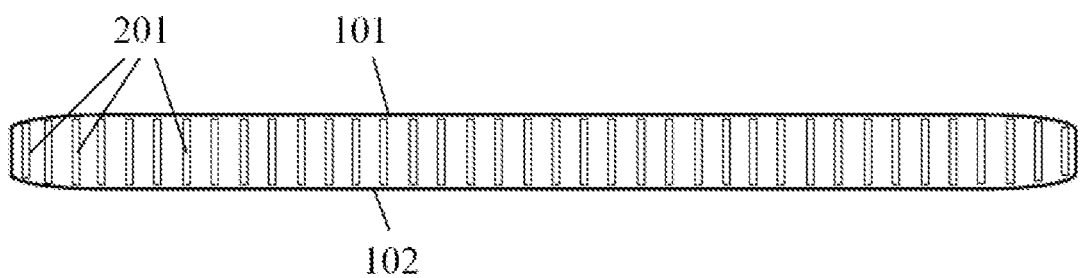
FIG. 2 is a cross section view of a curved display panel along the A-A' line in FIG. 1 according to an embodiment of the invention.

In some embodiments of the invention, the light leakage index of the curved display panel is smaller than the second preset value. As shown in FIG. 2, the distribution densities of the spacers in every region of the curved display panel are the same. The height of the spacers 201 in the peripheral region is smaller than the height of the spacers 201 in the central region. In the embodiment shown in FIG. 2, it is assumed that the light leakage index is smaller than the second preset value. In an assembly state, due to the spacers 201, the cell thickness of the central region in the curved display panel is greater than the cell thickness of the periphery region.

In some embodiments of the invention, the original heights of the spacers in every region of the curved display panel are the same. The distribution density of the spacers in the peripheral region is smaller than the distribution density of the spacers in the central region if the light leakage index is smaller than the second preset value. The distribution density of the spacers in the peripheral region is greater than the distribution density of the spacers in the central region if the light leakage index is greater than the second preset value.

In the context of the present disclosure, the "original height" refers to the height of the spacer before the cell aligning process.

Figure 3A:
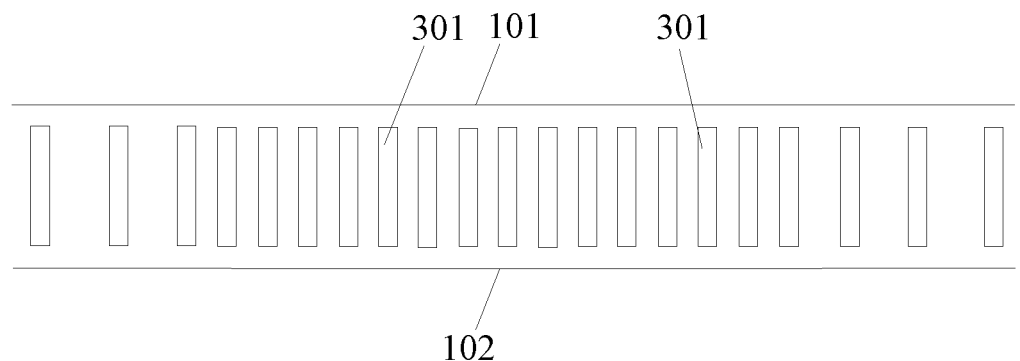
FIG. 3A is a disassembly schematic diagram of a curved display panel according to an embodiment of the invention.
Figure 3B:
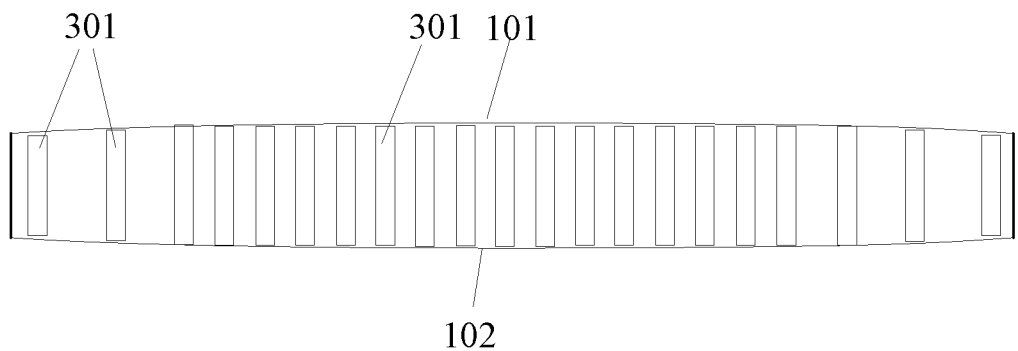
FIG. 3B is an assembly schematic diagram of a curved display panel according to an embodiment of the invention.

In some embodiments of the invention, the light leakage index of the curved display panel is smaller than the second preset value. As shown in FIG. 3A, prior to the cell aligning process, the original heights of the spacers 301 in every region of the curved display panel are the same. Therefore, the height of the spacers 301 in the central region of the curved display panel is same with the height of the spacers 301 in the periphery region. The distribution density of the spacers in the central region is greater than the distribution density of the spacers in the peripheral region. As shown in FIG. 3B, after the cell aligning process, the height of the spacers 301 in the central region of the curved display panel is greater than the height of the spacers 301 in the periphery region.

Figure 3C:
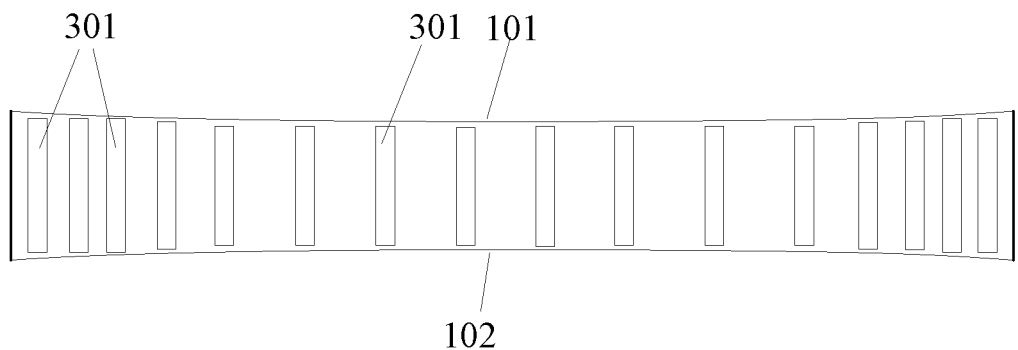
FIG. 3C is an assembly schematic diagram of a curved display panel according to another embodiment of the invention.

FIG. 3C is an assembly schematic diagram of a curved display panel according to another embodiment of the invention. In this embodiment, prior to the cell aligning process, the original heights of the spacers 301 in every region of the curved display panel are the same. Therefore, the height of the spacers 301 in the central region of the curved display panel is same with the height of the spacers 301 in the periphery region. The distribution density of the spacers in the central region is smaller than the distribution density of the spacers in the peripheral region. As shown in FIG. 3C, after the cell aligning process, the height of the spacers 301 in the central region of the curved display panel is smaller than the height of the spacers 301 in the periphery region.

In some embodiments of the invention, the distribution density of the spacers in the peripheral region differs by at least three times from the distribution density of the spacers in the central region. That is, if the cell thickness of the periphery region is designed to be smaller than the cell thickness of the central region, the distribution density of the spacers in the central region is at least four times the distribution density of the spacers in the periphery region. If the cell thickness of the periphery region is designed to be greater than the cell thickness of the central region, the distribution density of the spacers in the periphery region is at least four times the distribution density of the spacers in the central region.

Figure 5:
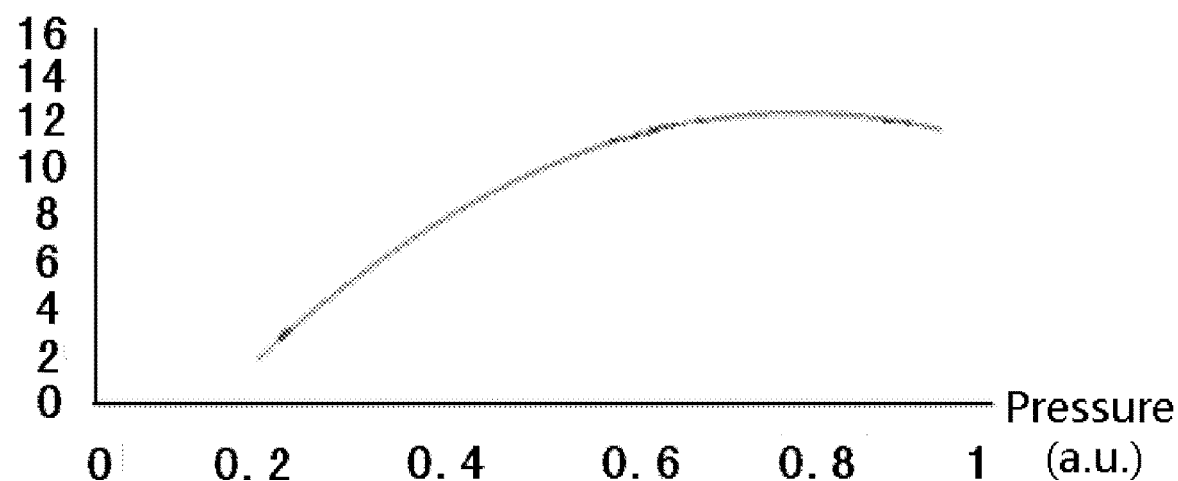
FIG. 5 is a schematic diagram of the relationship between the deformation amount of the spacer and stress on the spacer.

In some embodiments of the invention, the original heights of the spacers are the same. If $\Delta nd$ of the curved display panel is smaller than 273 nm, the distribution density of the spacers can be adjusted such that the distribution density of the spacers in the periphery region is smaller than the distribution density of the spacers in the central region. Therefore, the deformation of the spacers in the central region is relatively small, the deformation of the spacers in the periphery region is relatively large, such that the cell thickness of the periphery region is smaller than the cell thickness of the central region. The light leakage amount of the periphery region is smaller than the light leakage amount of the central region, the uneven distribution of light leakage caused by bending can be offset, increasing the brightness consistency of the entire curved display panel, improving the display effect. In another embodiment of the invention, if $\Delta nd$ of the curved display panel is greater than 273 nm, the cell thickness of the central region should be smaller than the cell thickness of the periphery region. Assuming $\Delta nd=363$ nm, for liquid crystal of a certain type $\Delta n=0.1$, then $d=3.63$ μm. If the interior of the cell is planar, the height of the spacer after assembly (i.e., the height of the deformed spacer) should be 3.63 μm. To regulate the light leakage on the periphery region of the curved display panel, the spacers in the periphery region should be adjusted, so that after the cell aligning process, the height of the deformed spacers in the periphery region is relatively large. To obtain different heights of the deformed spacers, the distribution density of the spacers in every region should be adjusted, the average pressure on the spacers can thus be different. In the region with a relatively large distribution density, the average pressure on the spacers is relatively small. In the region with a relatively small distribution density, the average pressure on the spacers is relatively large. The deformation of the spacer can thus be adjusted by different pressure, forming the difference of height. In this embodiment, the height of the spacers after the cell aligning process should be 3.63 μm or Bμm, B>3.63. The height 3.63 μm of the deformed spacer is formed with a large deformation of the spacer. The height Bμm of the deformed spacer is formed with a relatively small deformation of the spacer. From FIG. 5 it can be seen that the deformation amount of the spacer is in a range of 2%~14%. To reduce the brightness difference between the periphery region and the central region, the height difference between the deformed spacers should be formed as large as possible. The large deformation amount is 14%. The height of the spacer before the cell aligning process is 4.22 μm. The small deformation amount is 2%, then B=4.13 μm. That is, the height of the deformed spacers in the periphery region is 4.13 μm, the height of the deformed spacers in the central region is 3.61 μm. Still referring to FIG. 5, the average pressure on the central region is about 0.75N, the average pressure on the periphery region is about 0.18N.

In some embodiments of the invention, the plurality of spacers are arranged on a side of the color film substrate close to a liquid crystal layer.

In some embodiments of the invention, the plurality of spacers are arranged on a side of the array substrate close to a liquid crystal layer.

In some embodiments of the invention, the height of the spacer is in a range of 0.1 μm-10 μm.

Referring to the simulation fitting curve shown in FIG. 4, the relationship between the light leakage amount Y and $\Delta nd$ is: $Y=-0.001(\Delta nd)^2+0.546(\Delta nd)-24.85=-0.001(\Delta nd-$ $273)^2+49.679$. That is, if $\Delta nd=273$ nm, the maximum light leakage amount $Y=49.679$ nits. When $Y=0$, $X\approx 50$ nm or 496 nm. Due to the requirements of process, the cell thickness cannot be too small, then $X=496$ nm, i.e., $d=4.1$ μm. The above values are simulated values, and there may be deviation in practical application. If the spacer is under a pressure of 0.2N during the cell aligning process (i.e., the deformation amount of the spacer is 2.6%), the height of the spacer after the cell aligning process should be 4.2 μm. To regulate the light leakage on the periphery region of the curved display panel, optionally, the designed height of the spacer is between 3.1 μm and 4.2 μm. Optionally, the height of the spacer is 4.2 μm.

In some embodiments of the invention, the periphery region is located on the upper edge and/or the lower edge of the curved display panel. Each peripheral region occupies 10%-30% of the entire display region of the curved display panel.

An embodiment of the present invention also provides a curved display, which comprises the curved display panel according to the abovementioned embodiments.

In the curved display panel and curved display provided by the embodiments of the invention, based on the parameter of liquid crystal refractive index and cell thickness of the curved display panel, spacers with different heights or distribution densities are arranged between the array substrate and color film substrate. In this way, the cell thickness for different region of the curved display panel is different, the uneven brightness phenomenon caused by the light leakage on the peripheral region can be avoided, reducing light leakage. The display effect of the curved display panel is then improved.

It can be understood that the above embodiments are only used for explanations rather than limitations to the present invention. The embodiments of the present application and the features of the embodiments can be combined with each other without conflict.

Apparently, the person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

What is claimed is:

1. A curved display panel comprising an array substrate and a color film substrate arranged oppositely, a plurality of spacers arranged between the array substrate and the color film substrate, a first curved side and a second curved side opposite to the first curved side; wherein based on a light leakage index of the curved display panel, a cell thickness of a central region is different with a cell thickness of a peripheral region closed to the first curved side or the second curved side, such that a light leakage amount of the peripheral region is smaller than a first preset value; the light leakage index is a product of a designed cell thickness d of the curved display panel and a refractivity difference $\Delta n$ of liquid crystal birefringence;

wherein the cell thickness of the peripheral region is smaller than the cell thickness of the central region if the light leakage index is smaller than a second preset value, so as to increase a light leakage amount of the central region; the cell thickness of the peripheral region is greater than the cell thickness of the central region if the light leakage index is greater than the second preset value, so as to increase the light leakage amount of the central region; the light leakage amount of the central region is increased to be the same as the light leakage amount of the peripheral region;

wherein the second preset value is the light leakage index corresponding to a maximum light leakage amount Y for the curved display panel;

and wherein the plurality of spacers are arranged on a surface of the color film substrate adjacent to a liquid crystal layer; alternatively, the plurality of spacers are arranged on a surface of the array substrate adjacent to a liquid crystal layer.

2. The curved display panel according to claim 1, further comprising a third side and a fourth side opposite to the third side; wherein the third side and the fourth side are curved; and wherein the cell thickness of the central region is different with a cell thickness of a peripheral region closed to the third side or the fourth side.

3. The curved display panel according to claim 1, wherein distribution densities of the spacers in every region of the curved display panel are the same;

wherein a height of the spacers in the peripheral region is smaller than a height of the spacers in the central region if the light leakage index is smaller than the second preset value; and wherein the height of the spacers in the peripheral region is greater than the height of the spacers in the central region if the light leakage index is greater than the second preset value.

4. The curved display panel according to claim 1, wherein original heights of the spacers in every region of the curved display panel are the same;

wherein a distribution density of the spacers in the peripheral region is smaller than a distribution density of the spacers in the central region if the light leakage index is smaller than the second preset value; and wherein the distribution density of the spacers in the peripheral region is greater than the distribution density of the spacers in the central region if the light leakage index is greater than the second preset value.

5. The curved display panel according to claim 4, wherein the distribution density of the spacers in the peripheral region differs by at least three times from the distribution density of the spacers in the central region.

6. The curved display panel according to claim 1, wherein the height of the spacer is in a range of 0.1 μm-10 μm.

7. The curved display panel according to claim 1, wherein the peripheral region occupies 10%-30% of a display region of the curved display panel.

8. The curved display panel according to claim 1 wherein the cell thickness of the curved display panel gradually changes from the central region to the peripheral region.

9. The curved display panel according to claim 1, wherein $Y=-0.001(\Delta nd-273)^2+49.679$.

10. A curved display comprising the curved display panel according to claim 1.

11. The curved display according to claim 10, wherein the curved display panel further comprises a third side and a fourth side opposite to the third side; wherein the third side and the fourth side are curved; and wherein the cell thickness of the central region is different with a cell thickness of a peripheral region closed to the third side or the fourth side.

12. The curved display according to claim 10, wherein distribution densities of the spacers in every region of the curved display panel are the same;

wherein a height of the spacers in the peripheral region is smaller than a height of the spacers in the central region if the light leakage index is smaller than the second preset value; and wherein the height of the spacers in the peripheral region is greater than the height of the spacers in the central region if the light leakage index is greater than the second preset value.

13. The curved display according to claim 10, wherein original heights of the spacers in every region of the curved display panel are the same;
   wherein a distribution density of the spacers in the peripheral region is smaller than a distribution density of the spacers in the central region if the light leakage index is smaller than the second preset value; and wherein the distribution density of the spacers in the peripheral region is greater than the distribution density of the spacers in the central region if the light leakage index is greater than the second preset value.

14. The curved display according to claim 13, wherein the distribution density of the spacers in the peripheral region differs by at least three times from the distribution density of the spacers in the central region.

15. The curved display according to claim 10, wherein the height of the spacer is in a range of 0.1 μm-10 μm.

16. The curved display according to claim 10, wherein the peripheral region occupies 10%-30% of a display region of the curved display panel.

17. The curved display according to claim 10, wherein the cell thickness of the curved display panel gradually changes from the central region to the peripheral region.

18. The curved display according to claim 10, wherein $Y=-0.001(\Delta nd-273)^2+49.679$.

* * * * *